VAPORIZATION SYSTEM

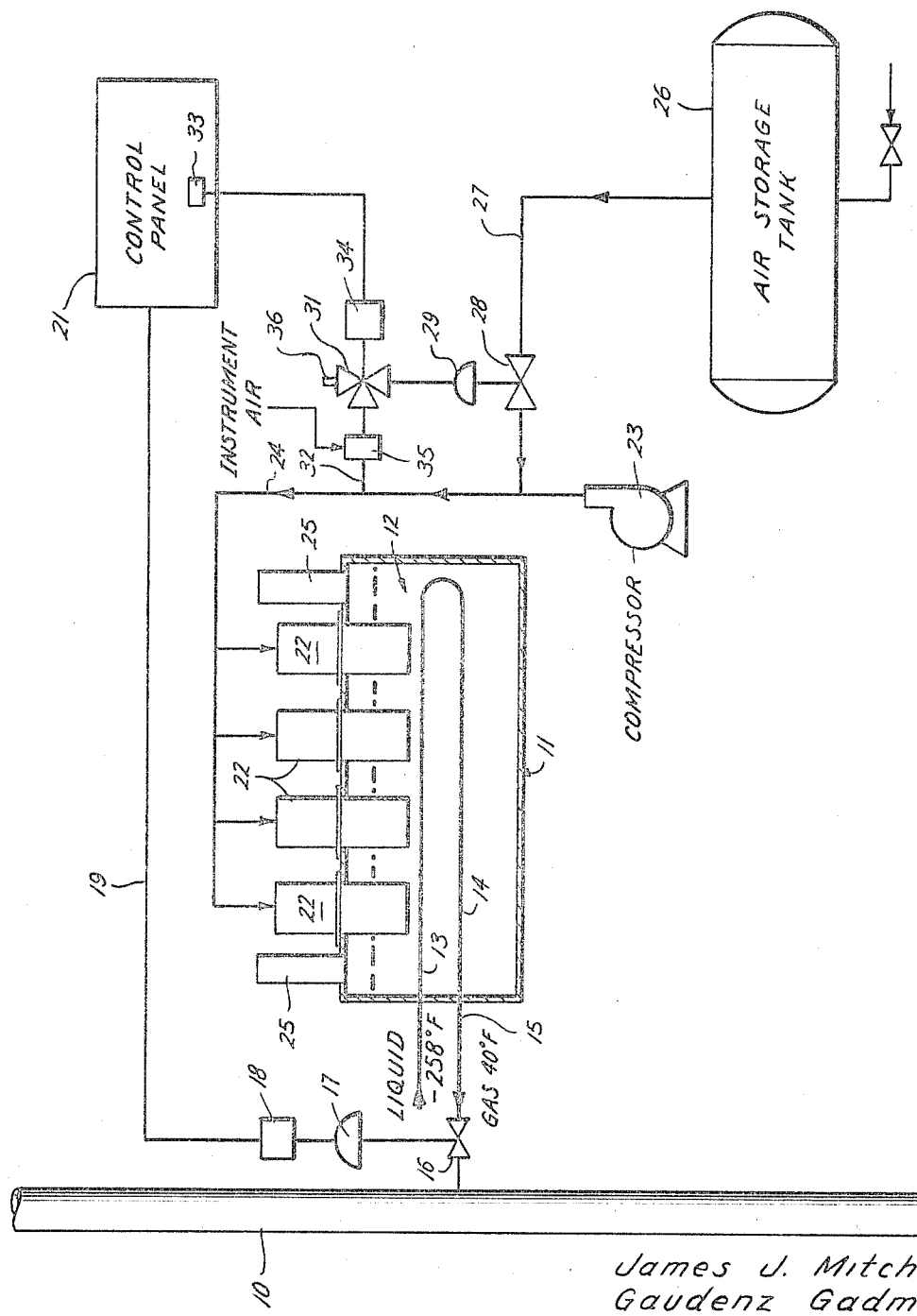

James J. Mitchell and Gaudenz Gadmer, both of Houston, Tex., assignors to Texas Eastern Transmission Corporation, Shreveport, La., a corporation of Delaware
Filed Oct. 2, 1964, Ser. No. 401,159
3 Claims. (Cl. 126—360)

This invention relates to vaporization systems, and more particularly to systems in which equipment downstream of the vaporizer is protected against contact with very cold fluids in the event of a malfunction of the vaporizer system or an emergency shutdown.

Vaporizers are used to vaporize very cold liquids such as liquefied natural gas. The equipment coming into contact with very cold liquid is made from materials which will withstand the low temperatures. Downstream from the vaporizer it is contemplated that relatively warm gas will be present, in the neighborhood of 40° F. or above when vaporizing and, therefore, this equipment is not made from materials which will withstand very cold temperatures. In the event of a malfunction of the heating system, valves are usually provided to shut in the system. These valves are very large, as they are handling a relatively high volume of flow, and it takes a considerable period of time to close these valves, even when on automatic operation. Due to the long time necessary to close the valves, it is possible that some cold fluid could reach the equipment downstream of the valve if some provision is not made to continue heat exchange in the vaporizer after the heating system has been shut down.

It is an object of this invention to protect a cold liquids vaporization system against cold fluids reaching equipment downstream of the vaporizer because said equipment is not designed to withstand low temperatures.

Another object is to prevent freezing of water around the tubes of the vaporizer for a finite time after shutdown of the heater so that heat exchange will continue for a sufficient time to permit the flow control valves to be closed before cold fluid reaches equipment downstream of said valve which is not designed to withstand low temperatures.

Other objects, features and advantages of the invention will be apparent from the drawing, the specification and the claims.

In the drawing, the single figure is partly in elevation and partly in section, illustrating a vaporization system employing this invention.

Where gas is supplied to an area through pipelines, a problem is presented during the time of peak demand. One solution to this problem is to store gas close to the point of use for providing additional gas during times of peak demands. Where no natural storage facilities are available, gas may be stored by liquefying natural gas and storing it in one or more large insulated tanks. When the gas is needed, it is withdrawn at a temperature of approximately −258° F., vaporized and supplied to a pipeline, such as pipeline 10, to provide the additional gas needed for peak demand.

The gas may be vaporized in a vaporizing tank indicated generally at 11, having therein a body of liquid such as water indicated generally at 12.

The liquefied natural gas enters through line 13 and passes through coil 14 in the vessel to the outlet line 15. The outline line is controlled by a valve 16 therein.

In the event of a malfunction of the vaporizing system, the very cold fluid must be prevented from reaching the pipeline because the metal of the pipeline and its associated equipment is not designed to withstand these very cold temperatures. For this purpose, the valve 16 is normally shut in at any time that a malfunction in the vaporizing system occurs. Preferably, the valve 16 is equipped with a motor 17 which opens or closes the valve in response to controller 18. The controller 18 is operated in response to a signal on line 19 from the control panel 21. In accordance with modern automation philosophy, the control panel 21 would be provided with means for sensing a malfunction in any portion of the vaporizing system, and, when the malfunction was sufficient to prevent the proper vaporization of the liquid, the valve 16 would be closed.

In the event of a sudden emergency, a finite time will be required to close the valve 16 due to its size. The line 15 will be conveying a very large amount of gas, and the valve 16, being large, will require considerable time to move from open to closed position. In accordance with this invention, means is provided for preventing very cold liquid from reaching the pipeline 10 before the valve 16 can be closed.

The vaporizer is provided with a plurality of submerged burners 22 of conventional form. The submerged burners are provided with fuel from a convenient source and combustion air is delivered by the compressor 23 through line 24 to the several submerged burners. The burners provide sufficient heat to the body of water 12 to vaporize the incoming liquid and raise its temperature to about 40° F. The products of combustion of the submerged burners pass down into the body of water 12 and agitate the water about the heat-exchange line 14 in which the liquefied natural gas is passing in indirect heat-exchange with the water 12. This agitation insures good heat-exchange relationship and distribution of the heat to the cold liquid. The products of combustion escape through the two stacks 25.

In the event of a failure of air to reach the submerged burners, agitation of the body of water 12 will cease and, as heat transfer through the coil 14 is very great, the water will freeze around the coil. If the body of water 12 can be kept in agitation for a short period of time after a malfunction occurs, then there will be time for the valve 16 to be closed before the cold liquefied natural gas can reach the pipeline 10.

For the purpose of temporarily maintaining the body of water 12 in agitation to permit maximum heat exchange across the line 14, there is provided a gas storage tank 26 which is preferably filled with air under pressure. Upon a malfunction in the system occurring, or upon the output pressure from the compressor 23 falling, the air from the air storage tank is fed into the vaporizer tank 11 to maintain the body of water agitated for a short period of time.

While the air storage tank might feed its stored air directly into the tank, it is preferred that the tank have an outlet line 27 connected with the line 24 from the compressor to feed its air directly into the submerged burners. This will have the added advantage of the air picking up the heat in the submerged burners 22, even though they may have turned off, to thus heat the air before it reaches the body of water 12, and deliver this heat to the body of water.

In accordance with this invention, a valve 28 is provided in line 27 and is operated by a motor 29. The motor 29 is in turn controlled by a control system which opens valve 28 in response to a reduction in pressure in the line 24. This system may include a pressure controller 35 which senses pressure in line 24 through the line 32. Instrument air is fed to the controller 35 and through switching valve 31 to motor 29. Upon the pressure in line 32 falling, the instrument air is modulated in controller 35 to change the pressure in motor 29 to open valve 28.

On occasions, it is desired to be able to stop action of the vaporizer on an emergency basis, and for this purpose the control panel includes as a portion of the emergency control a switch 33 which operates a solenoid 34 associated with the valve 31 to switch the valve 31 to connect the motor 29 with vent 36 and thus actuate motor 29 to open the valve 28 and supply the stored air through line 24 to the tank 11.

In operation, the air in storage tank 26 is not utilized except under emergency conditions. While they are not shown, suitable controls are provided for isolating the air storage tank when the vaporizer is shut down under normal operating conditions.

When a malfunction in the vaporizing system occurs, such as failure of the motor-driven compressor 23 or loss of power, the pressure in line 24 drops to actuate controller 35, and open valve 28. This results in compressed air from air storage tank 26 being fed through line 24 into the submerged burners and thence into the body of water 12 to agitate the water and continue heating the liquefied natural gas for a short period of time. During this period of time, the automatic controls will have sensed the malfunction, and the main control valve 16 will be closed by motor 17.

In the event an emergency occurs, switch 33 will actuate valve 31 and thus open valve 28 to permit the compressed air to flow to the body of water 12 to prevent cold fluid from reaching the downstream facilities before the valve 16 can close.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:
1. A vaporization system comprising,
   a tank,
   a body of liquid in the tank,
   means for heating said liquid,
   a coil submerged in said body of liquid for conveying a fluid to be vaporized through said liquid in indirect heat-exchange relation therewith,
   a source of compressed gas,
   means including a normally closed valve connecting said source of compressed gas to said tank, and
   means for opening said valve.

2. A vaporization system comprising,
   a tank,
   a body of liquid in the tank,
   means for heating said liquid,
   a coil submerged in said body of liquid for conveying a fluid to be vaporized through said liquid in indirect heat-exchange relation therewith,
   a source of compressed gas,
   means including a normally closed valve connecting said source of compressed gas to said tank, and
   means opening said valve in response to a malfunction of said heating means.

3. A vaporization system comprising,
   a tank,
   a body of water in said tank,
   submerged burners extending into said body of water,
   an air compressor,
   conduit means for connecting the compressor and burners for supplying aid to said burners,
   a coil submerged in said body of liquid for conveying a fluid to be vaporized through said water in indirect heat-exchange relationship therewith,
   a source of compressed gas,
   a valve-controlled conduit connecting the source of compressed gas with said conduit means, and
   means opening said valve in response to a reduction in pressure in said conduit means to a selected value.

References Cited by the Examiner

UNITED STATES PATENTS

| 215,372 | 5/1879 | Kuehne | 165—109 |
| 2,094,908 | 10/1937 | Thrall | 62—52 X |
| 2,335,837 | 11/1943 | Abramson | 62—52 X |
| 3,048,164 | 8/1962 | Walker | 126—360 |
| 3,060,921 | 10/1962 | Luring et al. | 126—360 X |
| 3,138,150 | 6/1964 | Hyer et al. | 126—360 |

FREDERICK L. MATTESON, JR., *Primary Examiner.*

R. A. DUA, *Assistant Examiner.*